(12) United States Patent
Greenwood et al.

(10) Patent No.: US 7,431,110 B2
(45) Date of Patent: Oct. 7, 2008

(54) HIGH-TORQUE GEAR ASSEMBLY FOR PERSONAL MOBILITY APPARATUS

(75) Inventors: Peter J. Greenwood, Cheshire, CT (US); Benedict J. Aliano, Oxford, CT (US)

(73) Assignee: Hartford Technologies, Inc., Rocky Hill, CT (US)

( * ) Notice: Subject to any disclaimer, the term of this patent is extended or adjusted under 35 U.S.C. 154(b) by 298 days.

(21) Appl. No.: 11/346,025

(22) Filed: Feb. 2, 2006

(65) Prior Publication Data
US 2006/0185916 A1    Aug. 24, 2006

Related U.S. Application Data

(60) Provisional application No. 60/650,068, filed on Feb. 4, 2005.

(51) Int. Cl.
*B60K 1/00* (2006.01)
(52) U.S. Cl. ................... 180/65.1; 180/907
(58) Field of Classification Search ........... 180/65.1, 180/907
See application file for complete search history.

(56) References Cited

U.S. PATENT DOCUMENTS

| | | | | |
|---|---|---|---|---|
| 3,710,640 A * | 1/1973 | Stanger et al. | ............... | 74/425 |
| 4,047,449 A | 9/1977 | Popov | ............... | 47/458 |
| 5,253,724 A * | 10/1993 | Prior | ............... | 180/6.5 |
| 6,029,763 A * | 2/2000 | Swisher | ............... | 180/65.6 |
| 6,345,678 B1 | 2/2002 | Chang | ............... | 180/181 |
| 6,415,686 B1 | 7/2002 | Milano, Jr. | ............... | 74/606 |
| 6,591,785 B1 | 7/2003 | Boshears | ............... | 119/707 |
| 2004/0210351 A1 * | 10/2004 | Wakefield et al. | ............... | 701/1 |

* cited by examiner

*Primary Examiner*—Christopher Ellis
*Assistant Examiner*—Katy Meyer
(74) *Attorney, Agent, or Firm*—St. Onge Stewart Johnston & Reens LLC

(57) ABSTRACT

A high-torque gear assembly for a personal mobility apparatus is disclosed generally comprising a shaft that drives a drive wheel of the personal mobility apparatus, a worm driven by a motor, and a worm wheel coupled to the shaft and driven by the worm, where both the worm wheel is a globoid gear and the worm is a globoid worm. In some embodiments, a gear train is coupled between a gear shaft and a drive wheel shaft for translating the rotational motion. In certain embodiments, the worm wheel and the worm have a gear ratio of at least 10:1, and the worm has a lead angle between twenty and thirty degrees.

16 Claims, 4 Drawing Sheets

HIGH-TORQUE GEAR ASSEMBLY FOR PERSONAL MOBILITY APPARATUS

CROSS-REFERENCE TO RELATED APPLICATIONS

This patent application claims the benefit of, under Title 35, United States Code, Section 119(e), U.S. Provisional Patent Application No. 60/650,068, filed Feb. 4, 2005.

FIELD OF THE INVENTION

The present invention relates to a gear assembly for a personal mobility device, such as a wheelchair. More specifically, the invention relates to gearing that increases torque output in gearboxes used for both back-drivability and mechanical release applications.

BACKGROUND OF THE INVENTION

Motorized personal mobility devices, such as wheelchairs, are generally well known. The wheels of such devices are typically powered by gearboxes connected thereto. Due to the common uses of a wheelchair, the gearmotor assembly must develop sufficient torque to drive the wheelchair and user through all typical passageways, which includes driving the wheelchair over common obstacles, such as small curbs and doorstops, which most people step over. Accordingly, a large, heavy gearbox is typically required in order to accommodate the large gearing necessary to accomplish this. However, due to the small size and common need for portability of such mobility devices, it is generally advantageous to employ gearboxes that do not require such larger, heavier gearing and gearboxes in order to handle the torque necessary to drive the wheelchair.

In order to accommodate these space and weight considerations, particular gearing arrangements have been suggested to limit the size of the gearboxes used to power the wheels of the chair. For example, in order to provide the necessary power to drive the wheels with gearing that can be housed within this limited space, it has been suggested to employ worming, such as in the design disclosed in U.S. Pat. No. 6,029,763 to Swisher. In this type of arrangement, a worm is used to drive a gear rotatable about an axis of rotation perpendicular to that of the worm, such that the threads of the worm engage the teeth of the gear driven thereby.

Such designs utilize conventional worming (illustrated in FIGS. 6A-B). In this type of gear set, the driven gear (i.e., "worm wheel") is curved—transverse to the longitudinal, rotational axis of the worm—such that it corresponds to the rounded surface of the worm, thereby providing better contact between the worm and the driven gear. However, with this type of gear set, the driven gear still curves away from the worm along the worm's longitudinal axis, and thus, only one to two gear teeth are in contact with the worm threads at any given time.

Alternative designs for worms, other than that incorporated into modern wheelchair gearmotors, have been suggested. One such design is the use of globoid worm, such as that disclosed in U.S. Pat. No. 4,047,449 to Popov. In this design, the worm is curved in the direction of the longitudinal axis of the worm, transverse to the rotational axis of the driven gear, such that it corresponds to the rounded surface of the driven gear. This type of design also provides improved contact between the worm and the driven gear.

A specific challenge that has remained regarding the gearing for wheelchairs is based on the fact that wheelchairs require the ability to move backwards. This has traditionally been accomplished in one of two ways. Some wheelchairs have a back-drivable feature, where a force is exerted in a backward direction in order to drive the wheel in this direction. In these cases, in order to allow for a low push-back force, the worm must be increased in size. In other wheelchairs, a gearbox neutral feature is used, where a lever is used to separate the gears, thereby leaving the wheels free to roll. In order to employ this type of mechanical release, smaller worming must be employed. Accordingly, because the size objectives of these approaches are diametrically opposed, until now, a single gearbox that is capable of accommodating both the mechanical release and a worm capable of back-drivability has not been feasible.

What is desired, therefore, is a gear assembly for a personal mobility device that maximizes torque output. What is further desired is gear assembly for a personal mobility device that minimizes the necessary size of the gearbox.

SUMMARY OF THE INVENTION

Accordingly, it is an object of the present invention to provide a gear assembly for a personal mobility apparatus that provides a high amount of torque.

It is a further object of the present invention to provide a gear assembly for a personal mobility apparatus that does not require a lot of space.

It is yet another object of the present invention to provide a gear assembly for a personal mobility apparatus that is not unnecessarily heavy.

It is still another object of the present invention to provide a gear assembly for a personal mobility apparatus that is not expensive or difficult to manufacture.

In order to overcome the deficiencies of the prior art and to achieve at least some of the objects and advantages listed, the invention comprises a personal mobility apparatus with a high-torque gear assembly, including a frame for supporting a rider, an electric motor mounted to the frame, a controller electrically connected to the motor with which the rider controls the motor, a worm driven by the motor, wherein the worm is a globoid worm, a worm wheel driven by the worm, wherein the worm wheel is a globoid gear, a shaft driven by the worm wheel, and a drive wheel driven by the shaft.

In another embodiment, the invention comprises a high-torque gear assembly for a personal mobility apparatus, including a housing, the housing having a first opening for accommodating at least part of a motor, and a second opening for accommodating at least part of a wheel drive shaft of the personal mobility apparatus, a worm disposed in the housing, the worm having a rotational axis about which the worm rotates when driven by the motor, a worm wheel disposed in the housing and driven by the worm, a gear shaft disposed in the housing and extending out from the worm wheel such that the gear shaft rotates with the worm wheel when driven by the worm, and a gear train disposed in the housing for transmitting the rotational motion of the gear shaft to the wheel drive shaft of the personal mobility apparatus, wherein the worm is a globoid worm, and wherein the worm wheel is a globoid gear.

In yet another embodiment, the invention comprises a high-torque gear assembly for a personal mobility apparatus, including a shaft adapted to drive a drive wheel of the personal mobility apparatus, a worm adapted to be driven by a motor of the personal mobility apparatus, and a worm wheel coupled to the shaft and driven by the worm, wherein the worm is a globoid worm, and wherein the worm wheel is a globoid gear.

In some of these embodiments, the shaft is a first shaft, and the invention further includes a second shaft coupled to the drive wheel, and a gear train coupled to the first and second shafts, wherein the gear train translates rotational motion of the first shaft into rotational motion of the second shaft to drive the drive wheel. In some of these embodiments, the invention further includes a release lever for separating at least one gear from at least one other gear.

In some embodiments the motor is a DC brush motor, and in certain embodiments, the invention includes an electric brake for braking the driving wheel, and a release lever for mechanically releasing the brake.

In some embodiments the worm is a multistart worm. In certain embodiments, the worm wheel and the worm have a gear ratio of at least 10:1, and in some cases, between about 10.25:1 and about 10.3:1. In some of these embodiments, the worm has a lead angle between about twenty and about thirty degrees.

DETAILED DESCRIPTION OF THE INVENTION

Figure 1:
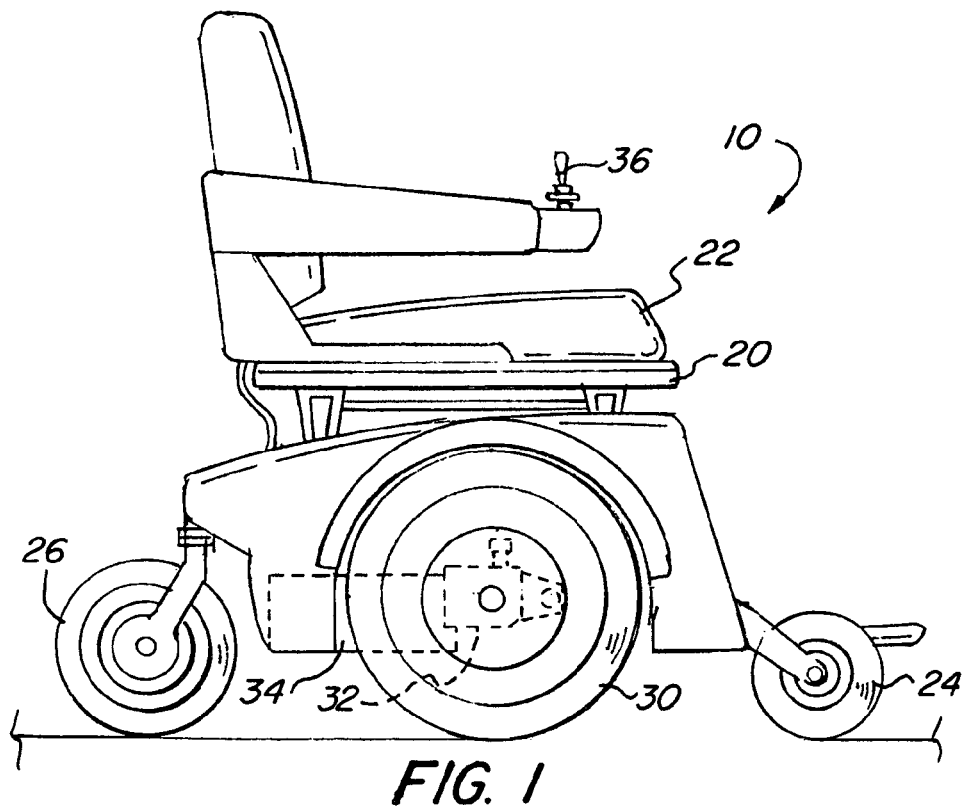
FIG. 1 is a side view of a personal mobility apparatus in accordance with the invention.
Figure 2:
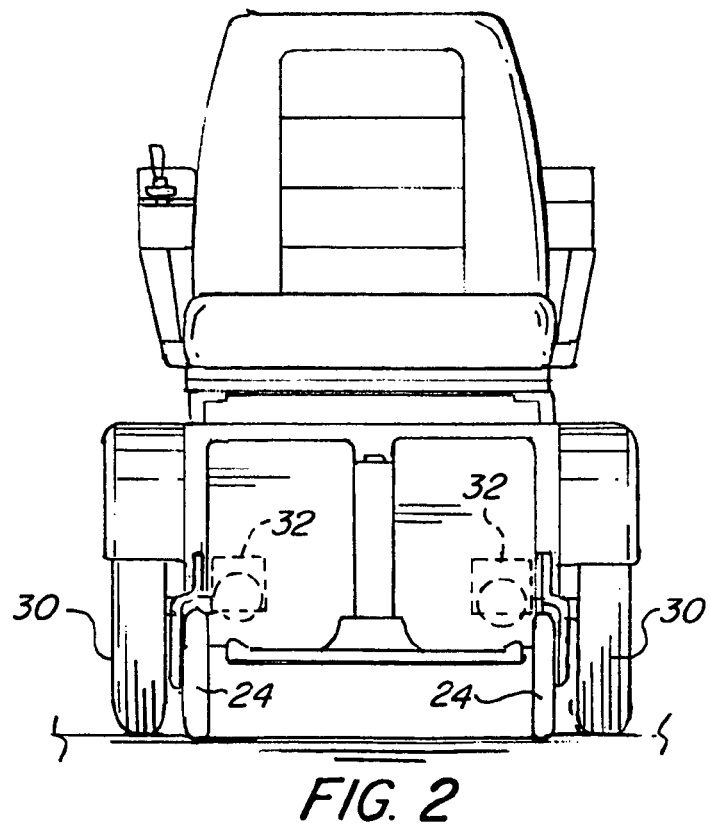
FIG. 2 is a rear view of the personal mobility apparatus of FIG. 1.

The basic components of one embodiment of a personal mobility apparatus 10 in accordance with the invention are illustrated in FIGS. 1-2. As used in the description, the terms "top," "bottom," "above," "below," "over," "under," "above," "beneath," "on top," "underneath," "up," "down," "upper," "lower," "front," "rear," "back," "forward" and "backward" refer to the objects referenced when in the orientation illustrated in the drawings, which orientation is not necessary for achieving the objects of the invention.

The wheelchair 10 includes a frame 20 that supports a seat 22 for carrying a rider. The frame 20 rolls along the ground via a plurality of auxiliary front and rear wheels 24, 26, and a plurality of drive wheels 30, which supply the force that actually propels the wheelchair 10 forward or backward. A gearbox 32 is mounted adjacent to each of the drive wheels 30 and is powered by at least one electric motor 34. The motor 34 is controlled manually by the rider via a controller 36, such as, for example, a joystick. Using the controller 36, the rider can turn the motor 34 on or off, can cause the wheelchair 10 to move forward or backwards, and, in some cases, can control the speed of the wheelchair 10.

In certain advantageous embodiments, the motor 34 is a DC brush motor, and two gearmotor assemblies are provided, one mounted adjacent each drive wheel 30 of the wheelchair 10. Both motors 34 are powered independently from a controller 36, which obtains power from two 12-volt batteries.

Figure 3:
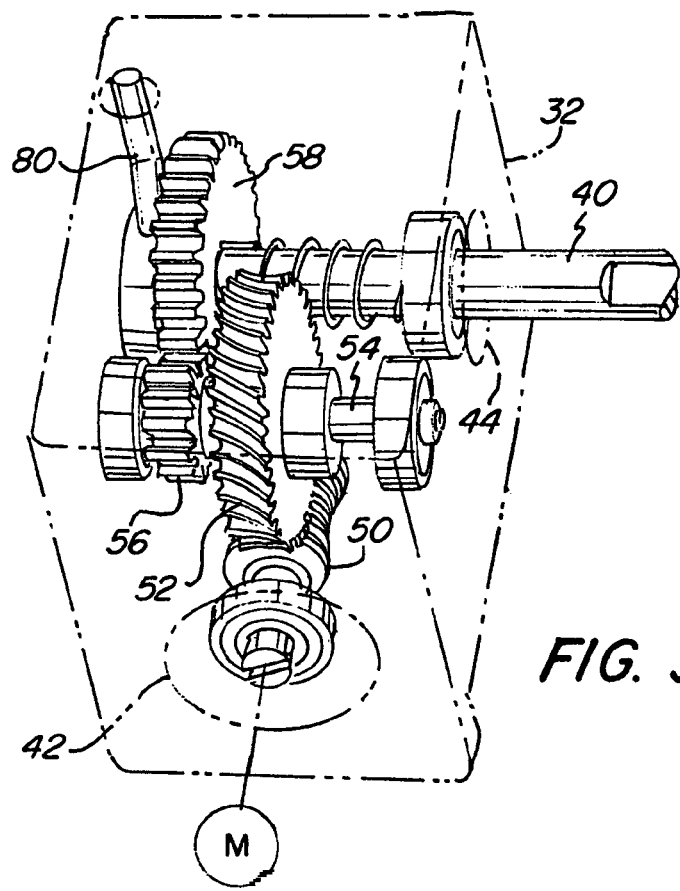
FIG. 3 is an isometric view of the gearbox of the personal mobility apparatus of FIGS. 1-2.
Figure 4:
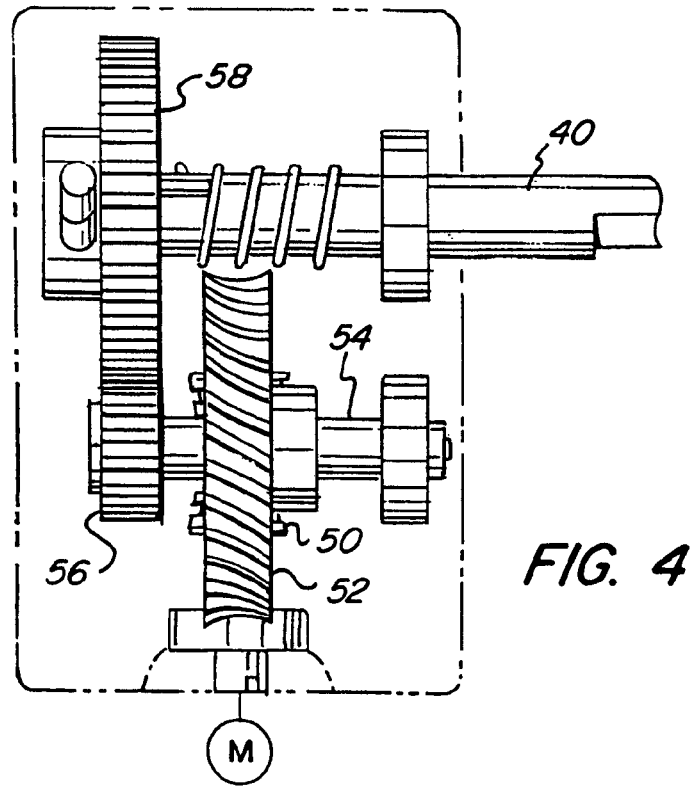
FIG. 4 is a top plan view of the gearbox of FIG. 3.

The gearbox 32, illustrated in more detail in FIGS. 3-4, includes a housing containing a gear assembly that is adapted to be coupled to the motor 34 via first opening in the housing, and thus, is driven thereby. The gear set drives a shaft 40, which is coupled to at least one drive wheel 30 via a second opening in the housing, and in this way, the gear set causes the drive wheel 30 to roll.

The gear assembly includes a worm 50, which drives worm wheel 52. In certain embodiments, the worm wheel 52 is mounted on a shaft 54, on which a small gear 56 is also mounted. The small gear 56 engages a larger gear 58, which is mounted on the drive wheel shaft 40. Accordingly, when the motor 34 rotates the worm 50, the worm 50 drives the worm wheel 52, which rotates the shaft 54, which, in turn, rotates the gear 56, which drives the gear 58, causing the shaft 40 to rotate, thereby rotating the drive wheel 30 coupled thereto. In this way, the gear train 56, 58 translates the rotational motion of the shaft 54 to the shaft 40.

Figure 5A:
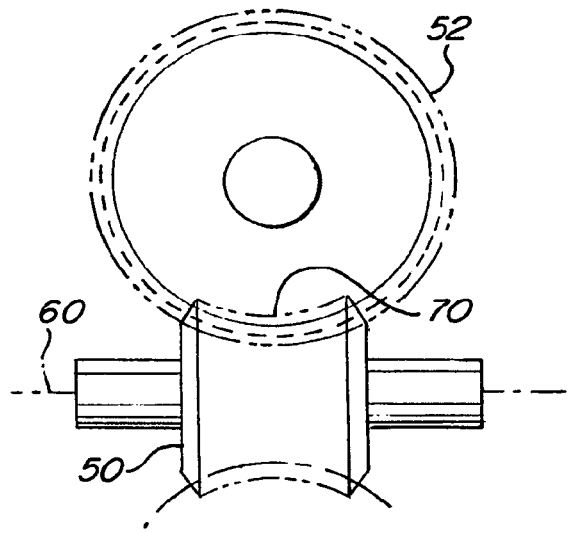
FIG. 5A is a side view of the worming of the gearbox of FIGS. 3-4.
Figure 6A:
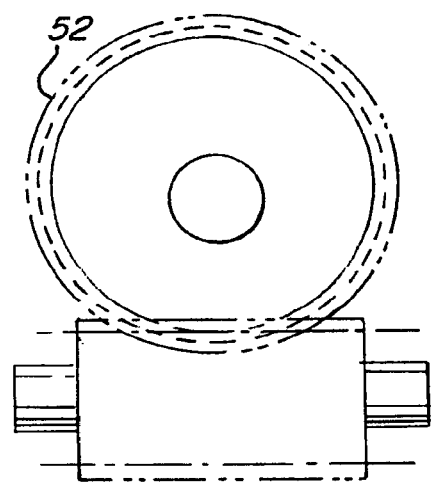
FIG. 6A is a side view of traditional worming used in personal mobility devices in the prior art.
Figure 5B:
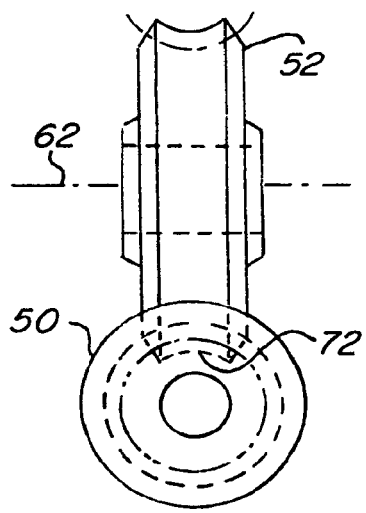
FIG. 5B is an end view of the worming of FIG. 5A.
Figure 6B:
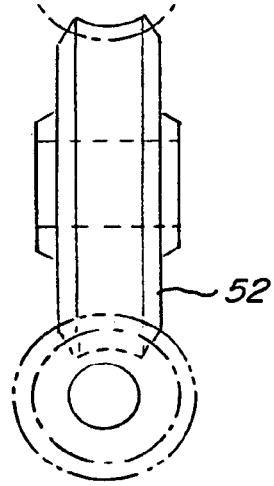
FIG. 6B is an end view of the worming of FIG. 6A.

As shown in FIGS. 5A-B, the gear set described above includes globoidal worming—that is, both the driving gear and the driven gear are globoids. Referring first to FIG. 5B, the driven gear (worm wheel) 52 has a toothed surface 72 with a concave curve—transverse to the longitudinal, rotational axis 60 of the worm 50—that corresponds to the convex curvature of the driving gear (worm) 50, much like the globoid worm wheel employed in convention worming, shown in FIG. 6B. Referring to FIG. 5A, the driving gear (worm 50) likewise has a threaded surface 70 with a concave curve—transverse to the rotational axis 62 of the worm wheel 52—that corresponds to the convex curvature of the driven gear (worm wheel) 52. This is unlike the worms employed in conventional worming, which can be seen by comparing FIG. 5A to the conventional worming illustrated in FIG. 6A.

Figure 7:
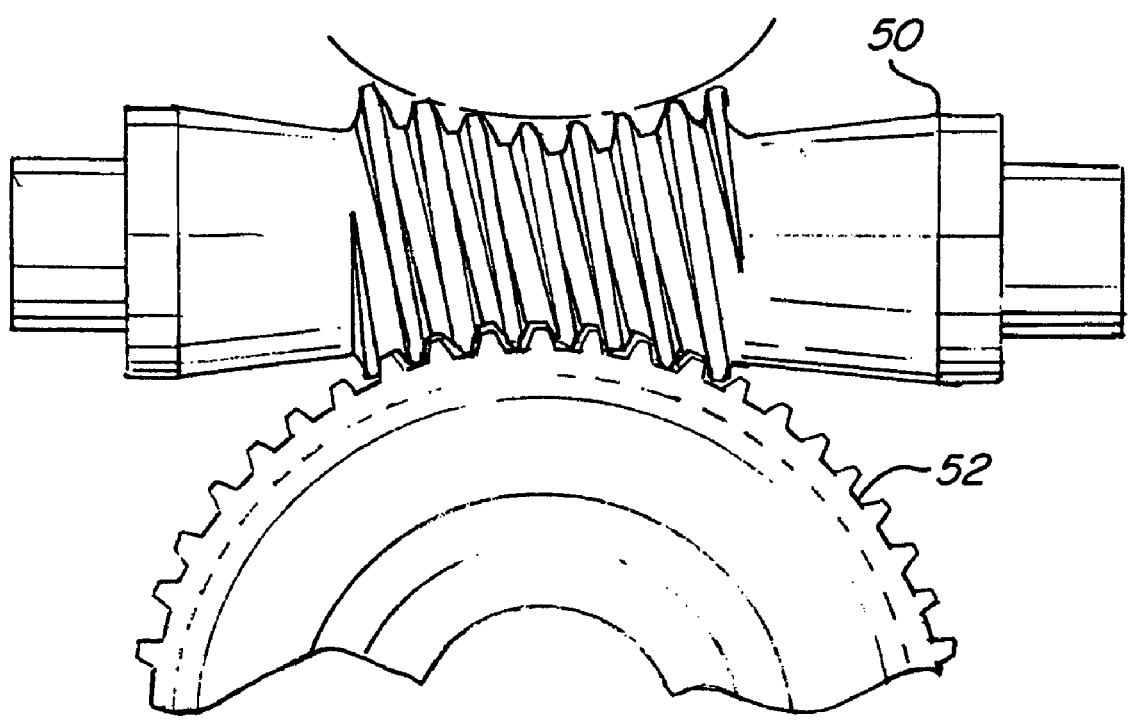
FIG. 7 is a side view of the worming of FIGS. 5A-B.

As a result of using not only a globoid worm wheel 52, but also, a globoid worm 50, the worming can handle significantly higher torque levels than conventional worming (FIGS. 6A-B) with the same size gear. This curvature of the worm 50, which is illustrated most clearly in FIG. 7, results in an arrangement where the side surfaces of the thread of the worm 50 are able to more completely envelop the side surfaces of the teeth in worm wheel 52 as the worm is rotated. As a result, three to eleven gear teeth are in contact with the worm at any given time, thereby providing the significantly higher torque output.

Due to this arrangement, the surface area of the mating thread and teeth of the globoidal worming can range anywhere from one and one-half to eleven times higher than conventional worming with the same size gears. This translates to significantly improved efficiency, enabling the globoidal gearing to easily handle two to three times the torque levels, while at the same time, reducing noise, backlash, and chatter. Conventional worming would require larger gears to transfer higher torque in order to avoid failure of the gears. This larger gearing would also require a larger gearbox to house the gearing, resulting in reduced ground clearance, additional weight, as well as increased cost, none of which are desirable in a wheelchair application. This unique application of globoidal worming thus eliminates the need to increase the size of the gears to handle higher torque levels, without increasing cost.

In certain advantageous embodiments, the worm wheel 52 and worm 50 have a gear ratio of about 10:1, such as, for example, where the gearing includes thirty teeth and three threads. In some of these embodiments, this gear ratio is between about 10.25:1 and 10.3:1. The lead angle of the worm 50 may vary, and may, for example, fall between about twenty and about thirty degrees in order to facilitate back-drivability. In certain advantageous embodiments, a multistart worm (i.e., multiple spirals) is employed.

In some embodiments, a lever 80 may be employed to mechanically release the mechanisms of the gear assembly, and in some embodiments, the controller 36 can be used to actuate such releases. For example, a mechanical release may be employed to separate at least one gear from at least one other gear, thereby allowing the drive wheel 30 to free-roll. In certain embodiments, an electric brake is employed, which can, for instance, be powered by the controller 36, and a mechanical release lever can, for example, be actuated in order to release the brake.

It should be understood that the foregoing is illustrative and not limiting, and that obvious modifications may be made by those skilled in the art without departing from the spirit of the invention. Accordingly, reference should be made primarily to the accompanying claims, rather than the foregoing specification, to determine the scope of the invention.

What is claimed is:

1. A personal mobility apparatus with a high-torque gear assembly, comprising:
    a frame for supporting a rider;
    an electric motor mounted to said frame;
    a controller electrically connected to said motor with which the rider controls said motor;
    a worm driven by said motor, wherein said worm is a globoid worm;
    a worm wheel driven by said worm, wherein said worm wheel is a globoid gear, and wherein said worm wheel and said worm have a gear ratio between 10.25:1 and 10.3:1;
    a shaft driven by said worm wheel; and
    a drive wheel driven by said shaft.

2. The personal mobility apparatus of claim 1, wherein said shaft is a first shaft, further comprising:
    a second shaft coupled to said drive wheel; and
    a gear train coupled to said first and second shafts, wherein said gear train translates rotational motion of said first shaft into rotational motion of said second shaft to drive said drive wheel.

3. The personal mobility apparatus of claim 2, further comprising a release lever for separating at least one gear from at least one other gear.

4. The personal mobility apparatus of claim 1, wherein said motor is a DC brush motor.

5. The personal mobility apparatus of claim 1, further comprising:
    an electric brake for braking said driving wheel; and
    a release lever for mechanically releasing said brake.

6. The personal mobility apparatus of claim 1, wherein said worm is a multistart worm.

7. The personal mobility apparatus of claim 1 wherein said worm has a lead angle between about twenty and about thirty degrees.

8. A high-torque gear assembly for a personal mobility apparatus, comprising:
    a housing, said housing having a first opening for accommodating at least part of a motor, and a second opening for accommodating at least part of a wheel drive shaft of the personal mobility apparatus;
    a worm disposed in said housing, said worm having a rotational axis about which said worm rotates when driven by the motor;
    a worm wheel disposed in said housing and driven by said worm;
    a gear shaft disposed in said housing and extending out from said worm wheel such that said gear shaft rotates with said worm wheel when driven by said worm; and
    a gear train disposed in said housing for transmitting the rotational motion of said gear shaft to the wheel drive shaft of the personal mobility apparatus;
    wherein said worm is a globoid worm;
    wherein said worm wheel is a globoid; and
    wherein said worm wheel and said worm have a gear ratio between 10.25:1 and 10.3:1.

9. The gear assembly of claim 8, further comprising a release lever protruding from said housing.

10. The gear assembly of claim 9, wherein said lever separates at least one gear from at least one other gear.

11. The personal mobility apparatus of claim 8, wherein said worm is a multistart worm.

12. The personal mobility apparatus of claim 8, wherein said worm has a lead angle between about twenty and about thirty degrees.

13. A high-torque gear assembly for a personal mobility apparatus, comprising:
    a shaft adapted to drive a drive wheel of the personal mobility apparatus;
    a worm adapted to be driven by a motor of the personal mobility apparatus; and
    a worm wheel coupled to said shaft and driven by said worm;
    wherein said worm is a globoid worm;
    wherein said worm wheel is a globoid gear; and
    wherein said worm wheel and said worm have a gear ratio between 10.25:1 and 10.3:1.

14. The gear assembly of claim 13, wherein said shaft is a first shaft, further comprising:
    a second shaft adapted to be coupled to a drive wheel; and
    a gear train coupled to said first and second shafts, wherein said gear train translates rotational motion of said first shaft into rotational motion of said second shaft to drive said drive wheel.

15. The gear assembly of claim 14, further comprising a release lever coupled to said gear set for separating at least one gear from at least one other gear.

16. The personal mobility apparatus of claim 13, wherein said worm is a multistart worm.

* * * * *